(12) United States Patent
Op De Beeck et al.

(10) Patent No.: US 11,117,458 B2
(45) Date of Patent: Sep. 14, 2021

(54) FUEL CELL ARCHITECTURE

(71) Applicant: Plastic Omnium Advanced Innovation and Research, Brussels (BE)

(72) Inventors: Joel Op De Beeck, Lint (BE); Bernard Gautherin, Compiegne (FR); Damien Boquel, Armancourt (FR); Eric Deparis, Levallois-Perret (FR); Paul Wouters, Vilvoorde (BE); Jean-Francois Berard, Boulogne Billancourt (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 81 days.

(21) Appl. No.: 16/626,150

(22) PCT Filed: Jun. 27, 2018

(86) PCT No.: PCT/EP2018/067274
§ 371 (c)(1),
(2) Date: Dec. 23, 2019

(87) PCT Pub. No.: WO2019/002381
PCT Pub. Date: Jan. 3, 2019

(65) Prior Publication Data
US 2020/0148075 A1 May 14, 2020

(30) Foreign Application Priority Data
Jun. 30, 2017 (EP) ...................................... 17305837

(51) Int. Cl.
*B60L 58/40* (2019.01)
*B60K 1/04* (2019.01)
(Continued)

(52) U.S. Cl.
CPC ................ *B60K 1/04* (2013.01); *B60L 58/40* (2019.02); *H01M 8/04925* (2013.01);
(Continued)

(58) Field of Classification Search
CPC .............. B60K 1/04; B60K 2001/0422; B60K 2015/0638; B60L 58/40; H01M 8/04925; H01M 16/003; H01M 2250/20
See application file for complete search history.

(56) References Cited

U.S. PATENT DOCUMENTS 7,040,432 B2 * 5/2006 Kawasaki .............. B60K 15/01
180/65.1
7,198,124 B2 * 4/2007 Amori ..................... B60R 16/04
180/68.5
(Continued)

FOREIGN PATENT DOCUMENTS

| WO | WO 2004/030969 A1 | 4/2004 |
|---|---|---|
| WO | WO 2005/014328 A2 | 2/2005 |
| WO | WO 2011/044964 A1 | 4/2011 |

OTHER PUBLICATIONS

International Search Report dated Sep. 28, 2018 in PCT/EP2018/067274 filed on Jun. 27, 2018.

*Primary Examiner* — Erez Gurari
(74) *Attorney, Agent, or Firm* — Oblon, McClelland, Maier & Neustadt, L.L.P.

(57) ABSTRACT

It is an object of the invention is a fuel cell system architecture provides a good weight distribution, improved trunk space without reducing the security against front-end and rear end collision. The above objective is accomplished by a fuel cell vehicle comprising:—A rear vessel for hydrogen gas located in the rear part of the vehicle,—A front vessel for hydrogen gas located in the front part of the vehicle,—A hydrogen dosing unit,—A hydrogen control unit connected to the hydrogen dosing unit, to the rear vessel and to the (Continued)

front vessel, the hydrogen control unit being provided with first means for equalizing the pressure between the first rear vessel and the front vessel, the hydrogen control unit being provided with second means for transferring hydrogen at a predetermined pressure level to the hydrogen dosing unit from the two vessels,—An air supply,—A fuel cell connected to the hydrogen dosing unit and the air supply, the air supply being provided with means for providing the fuel cell with air, the hydrogen dosing unit providing the fuel cell with hydrogen,—A battery,—A DC/DC-converter,—The fuel cell being connected to the battery so as to provide the battery with energy, the battery and the DC/DC-converter being interconnected so as to exchange energy, the fuel cell and the battery, being located at the bottom of the vehicle.

12 Claims, 2 Drawing Sheets

(51) Int. Cl.
 H01M 8/04858 (2016.01)
 H01M 16/00 (2006.01)
 B60K 15/063 (2006.01)
(52) U.S. Cl.
 CPC ... *H01M 16/003* (2013.01); *B60K 2001/0422* (2013.01); *B60K 2015/0638* (2013.01); *H01M 2250/20* (2013.01)

(56) References Cited

U.S. PATENT DOCUMENTS

| | | | | |
|---|---|---|---|---|
| 7,363,997 B2* | 4/2008 | Sato | ............ | B60K 15/07 180/65.31 |
| 7,770,679 B2* | 8/2010 | Takaku | ............ | H01M 8/04014 180/68.5 |
| 7,926,601 B2* | 4/2011 | Ono | ............ | H01M 50/20 180/68.5 |
| 8,083,263 B2* | 12/2011 | Yamanami | ............ | B62D 21/152 280/830 |
| 8,960,360 B2* | 2/2015 | Sangha | ............ | B60K 13/06 180/309 |
| 10,493,837 B1* | 12/2019 | Angelo | ............ | B60K 6/46 |
| 2004/0101725 A1* | 5/2004 | Kato | ............ | H01M 8/04126 429/413 |
| 2004/0214054 A1* | 10/2004 | Shige | ............ | H01M 8/0488 429/429 |
| 2005/0139402 A1* | 6/2005 | Yamashita | ............ | B60K 15/063 429/413 |
| 2005/0224265 A1* | 10/2005 | Mizuno | ............ | B60K 1/04 429/413 |
| 2006/0021805 A1* | 2/2006 | Yamashita | ............ | B60K 1/04 180/65.1 |
| 2006/0102398 A1* | 5/2006 | Mizuno | ............ | B60L 58/33 429/430 |
| 2006/0113131 A1* | 6/2006 | Kato | ............ | H01M 8/04089 429/434 |
| 2006/0185915 A1 | 8/2006 | Kaneko | | |
| 2008/0093140 A1* | 4/2008 | Asai | ............ | B62D 21/17 180/65.1 |
| 2008/0149410 A1 | 6/2008 | Yang et al. | | |
| 2011/0165499 A1* | 7/2011 | Janarthanam | ............ | B60L 58/40 429/513 |
| 2011/0233996 A1* | 9/2011 | Kato | ............ | B60L 58/40 307/9.1 |
| 2012/0021301 A1* | 1/2012 | Ohashi | ............ | B62D 25/2072 429/400 |
| 2016/0137098 A1* | 5/2016 | Katano | ............ | B60L 58/40 307/10.1 |
| 2017/0324106 A1* | 11/2017 | Sinha | ............ | H01M 8/04649 |
| 2018/0138530 A1* | 5/2018 | Tabatowski-Bush | ............ | G01R 31/007 |
| 2018/0201125 A1* | 7/2018 | Mori | ............ | B60K 1/00 |
| 2018/0205106 A1* | 7/2018 | Murata | ............ | H01M 8/04388 |
| 2018/0290560 A1* | 10/2018 | Takeyama | ............ | H01M 8/04089 |
| 2019/0263450 A1* | 8/2019 | Inoue | ............ | B62D 21/18 |

* cited by examiner

FUEL CELL ARCHITECTURE

TECHNICAL FIELD OF THE INVENTION

The present invention relates to the architecture of component parts for a fuel cell vehicle and especially the location of the battery, the super capacitor and the hydrogen storage vessels.

BACKGROUND OF THE INVENTION

Existing fuel cell vehicles are equipped with a fuel cell generation system that generates electric power for driving a motor to operate the vehicle. Such vehicles are provided with a hydrogen vessel for providing energy to the motor.

The document US 2008/0149410 discloses an arrangement structure of component parts for a fuel cell vehicle comprising an engine room in which a motor and air blower are mounted on the upper portion of a frame. A hydrogen vessel is provided at the rear of the vehicle and the motor at the front. It stores hydrogen at high pressure, e.g. 35 MPa to 70 MPa. Components parts of an electrical system and a fuel cell system are arranged on the upper portion of the motor. Under the vehicle floor, a humidifier, a stack, a fuel processing system and a hydrogen vessel are mounted. A super capacitor and a battery are mounted in a trunk room.

Today, when the chassis is made of light composite material, a problem with above structure is that when the hydrogen vessel is full, there is a risk that the weight balance is offset towards the rear.

This is compensated by the fact that the battery and the super capacitor, which are heavy, are located in the front.

On the other hand, when the vessel is empty, the location of said component parts in the front offset the weight balance of the vehicle towards the front.

A further problem with said solution is that as the battery and the super capacitor are cumbersome, thus they reduce the available space in the trunk room.

SUMMARY OF THE INVENTION

It is an object of the invention to provide a vehicle with a fuel cell system architecture having a good weight distribution, improved trunk space without reducing the security against front end and rear end collision.

The above objective is accomplished by a vehicle with fuel cell system comprising:
a rear vessel for hydrogen gas located in the rear part of the vehicle,
a hydrogen dosing unit,
an air supply,
a fuel cell connected to the hydrogen dosing unit and the air supply, the air supply being provided with means for providing the fuel cell with air, the hydrogen dosing unit providing the fuel cell with hydrogen,
a battery,
a DC/DC-converter,
characterised in that the vehicle further comprises:
a front vessel for hydrogen gas located in the front part of the vehicle,
a hydrogen control unit connected to the hydrogen dosing unit, to the rear vessel and to the front vessel, the hydrogen control unit being provided with first means for equalizing the pressure between the first rear vessel and the front vessel, the hydrogen control unit being provided with second means for transferring hydrogen at a predetermined pressure level to the hydrogen dosing unit from the two vessels, and
the fuel cell being connected to the battery so as to provide the battery with energy, the battery and the DC/DC-converter being interconnected so as to exchange energy, the fuel cell and the battery, being located at the bottom of the vehicle.

An advantage of said vehicle is that it provides a good weight distribution and improved trunk space.

According to a further embodiment, the fuel cell is connected to the DC/DC-converter in order to provide the DC/DC converter with energy.

An advantage of using a DC/DC converter is that it decreases the voltage of direct current power from the fuel cell.

According to yet a further embodiment, the DC/DC-converter is located at the bottom of the vehicle.

An advantage of locating the DC/DC-converter at the bottom of the vehicle is to provide more trunk space in the vehicle.

According to an embodiment, the fuel cell system comprises a super capacitor, the fuel cell being connected to the super capacitor so as to provide the super capacitor with energy, the super capacitor being interconnected to the battery so as to exchange energy, and the super capacitor being interconnected to the DC/DC-converter so as to exchange energy.

An advantage of using a super capacitor is that it can store more energy than a battery at equal weight.

According to a further embodiment, the super capacitor is located at the bottom of the vehicle.

An advantage of locating the super capacitor at the bottom of the vehicle is that it facilitates the provision of a weight balanced vehicle.

According to yet a further embodiment, the super capacitor is adapted to be integrated in the bottom frame of the vehicle.

An advantage of integrating the super capacitor in the bottom frame is that it facilitates the provision of a weight balanced vehicle and provides a more efficient use of vehicle space.

According to yet a further embodiment, the weight difference between the two vessels is less than 30%, preferably less than 15%, most preferably less than 1%.

It is important to balance the weight between the two vessels. It is thus most preferable that they are of equal weight. However, when there is a weight difference, it can be compensated by locating other components in the vicinity of the lightest vessel.

According to a further embodiment, the front vessel is located above the feet of the driver and the passenger in the front seat, in the cavity under the dashboard.

An advantage of locating the front vessel above the feet of the driver and the passenger in the front seat, in the cavity under the dashboard, is that security against front-end collision is provided.

According to an embodiment, the air conducts are located on the side of the vehicle.

According to a further embodiment, the air conducts are located along or under the floor of the vehicle.

An advantage of locating the air conducts on the side of the vehicle, along or under the floor of the vehicle is that space under the dashboard is released.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of fuel cell system in the automotive industry, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
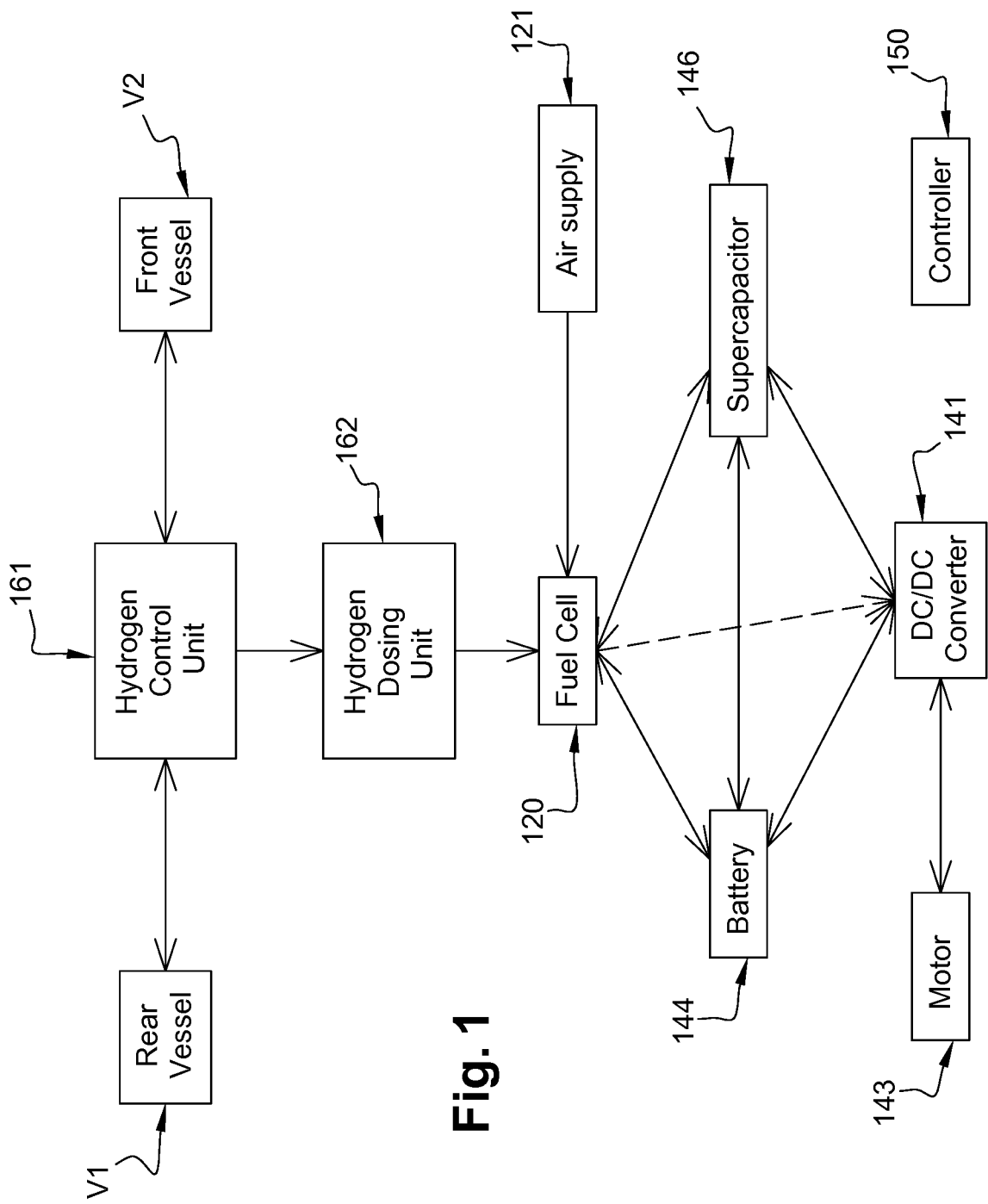
FIG. 1 is a functional diagram of the components in a fuel cell system according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "connected" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

A fuel cell is a device that converts the chemical energy from a fuel into electricity through a chemical reaction of positively charged hydrogen ions with oxygen or another oxidizing agent. Fuel cells are different from batteries in requiring a continuous source of fuel and oxygen or air to sustain the chemical reaction, whereas in a battery the chemicals present in the battery react with each other to generate an electromotive force. Fuel cells can produce electricity continuously for as long as these inputs are supplied.

A super capacitor is a high-capacity capacitor with capacitance values much higher than other capacitors (but lower voltage limits). They typically store 10 to 100 times more energy per unit volume or mass than electrolytic capacitors, can accept and deliver charge much faster than batteries, and tolerate many more charge and discharge cycles than rechargeable batteries. Thus, a super capacitor is able to collect energy when a car slows down, for example due to a traffic light, and then immediately deliver said energy in order to enable the car to accelerate. A super capacitor has a life expectancy that is 100 times higher than a battery but is very heavy.

A DC/DC converter that is connected between a fuel cell and a motor increases a direct current voltage supplied from a battery and outputs it to a traction inverter (that is connected to a motor) or a motor of a vehicle. The DC/DC converter decreases the voltage of direct current power generated by a fuel cell (or another power generating unit such as a super capacitor or a motor) and stores the resulting power in a battery.

The expression "in the bottom of the vehicle" refer to a location under the passenger's seat, preferably at floor level or under the floor of the vehicle.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

FIG. 1 is a functional diagram of the components in a fuel cell system according to the invention. A rear vessel V1 that stores hydrogen gas at high pressure (e.g. between 35 MPa and 70 MPa) located in the rear part of the vehicle is connected to a front vessel V2 that stores hydrogen gas at high pressure located in the front part of the vehicle. At least one of the vessels is provided with an opening, not shown, for the provision of hydrogen gas. A hydrogen control unit 161 is connected to the rear vessel V1 and to the vessel V2. The hydrogen control unit 161 is also connected to a hydrogen dosing unit 162 that is connected to a fuel cell 120. An air supply 121 is connected to the fuel cell 120. The fuel cell system comprises also a battery 144 and a DC/DC converter 141. The system shown in FIG. 1 comprises a super capacitor 146. However, a fuel cell system with two vessels V1 and V2 may function without super capacitor, if the battery is large enough. An inconvenience with a large battery is that it takes more space and is heavy. The fuel cell 120 is connected to the battery 144 and the super capacitor 146. The DC/DC converter 141 is connected to the battery 144 and the super capacitor 146. The DC/DC converter is connected to a motor 143. A tractor inverter (not shown in FIG. 1) may be connected between the DC/DC converter and the motor. The fuel cell 120 may be connected to the DC/DC converter 141.

When in use, the hydrogen control unit 161 controls the flow of hydrogen gas between the two hydrogen vessels V1, V2 in order to control the pressure in the system and its separate vessels. The hydrogen control unit also provides the fuel cell with hydrogen from the vessels V1, V2 and converts hydrogen from the storage pressure to the fuel cell feed pressure of less than 10 bars.

It should be noted that the fuel cell is designed to handle hydrogen at not more than 10 bars as there is no need for higher pressure. It is easier to handle hydrogen at 10 bars than at e.g. 700 bars. For application at higher pressure than 10 bars, the fuel cell and all its subcomponents would have to be redesigned.

The hydrogen dosing unit 162 checks that the fuel cell is provided with an optimal amount of hydrogen for the operation of the motor 143. The air supply 121 provides the fuel cell 120 with air to be used in the combustion process.

The important feature of the fuel cell system is the fact that it comprises two vessels, one in the front and the other in the rear of the vehicle, and that each vessel is connected to the same hydrogen control unit, that equalize the hydrogen stored in the two vessels.

The vessels are much heavier than the hydrogen they are storing. It is thus important to balance the weight of the front and rear vessel. Preferably the vessels have the same weight. Optionally, when there is a weight difference between the rear vessel and the front vessel, other components can be used to balance the weight difference.

When in use, the fuel cell 120 provides the battery 144 and/or the super capacitor 146 with electrical energy, that is then stored in the battery and/or the super capacitor. The battery has a high capacity of energy storage, whereas the super capacitor has a high power. By interconnecting these two components, it is possible to obtain a high storage capacity (from the battery) and occasionally, when needed, high power, without having to install a battery of a size of more than 10 kWh.

When in use, the battery 144 and the super capacitor 146 may transfer energy to each other. E.g., the super capacitor collects energy when the motor curbs, and provides a punctual acceleration at a later time.

When in use, the DC/DC-converter decreases the voltage of direct current power from the fuel cell, the battery and/or the super capacitor, and provides the motor 143 with electrical energy at a predefined voltage level.

Also, the DC/DC converter 141, may receive energy from the motor 143, e.g. when the motor brakes, that the DC/DC-converter transfers to the battery and/or the super capacitor for temporary storage.

According to a preferred embodiment, the DC/DC-converter is located in the bottom of the vehicle, thus contributing to a low centre of gravity. This centre of gravity contributes to vehicle stability in dynamic driving conditions.

It is an important feature of the fuel cell system that the battery 144 and the super capacitor 146, when the fuel cell system comprises a super capacitor, are located in the bottom of the vehicle. As the battery and the super capacitor are the heaviest components of the fuel cell system, the location in the bottom part of the vehicle facilitates the provision of a weight balanced vehicle.

According to a preferred embodiment, the super capacitor is configured so that it can be integrated with the bottom frame of a vehicle. Thus, it is possible to optimise the space.

By locating the battery and the super capacitor under the floor of the vehicle, trunk space is liberated.

The fact that two hydrogen vessels of about equal size are used, one located in the rear part of the vehicle, the other located in the front part of the vehicle, enables a better optimisation of the weight balance of the vehicle.

Figure 2:
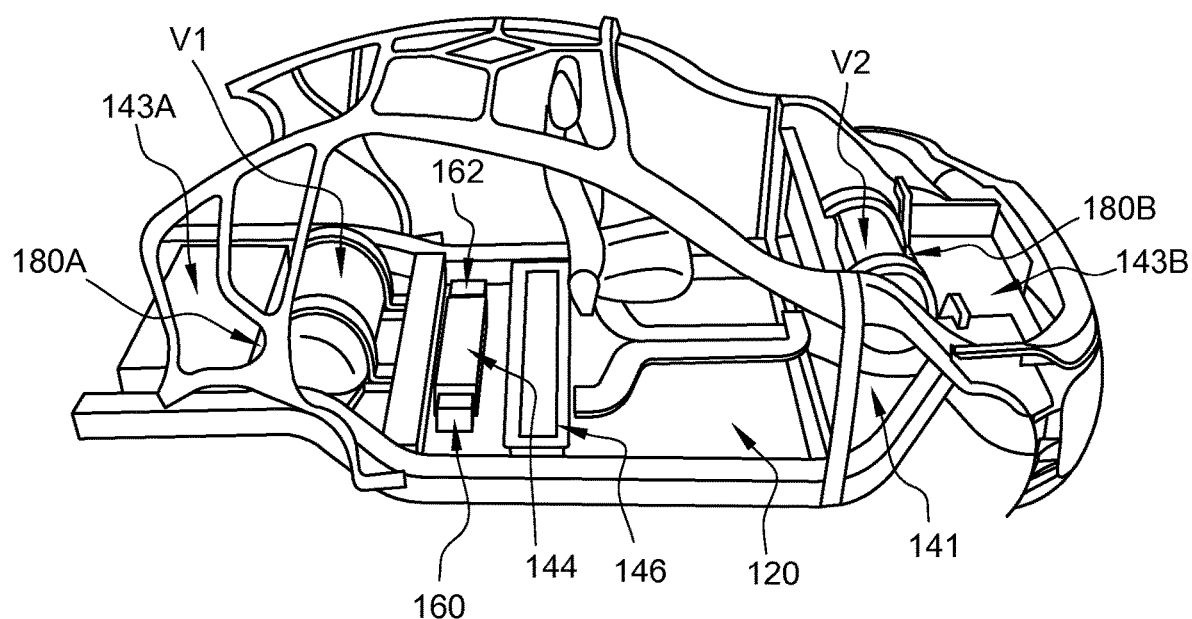
FIG. 2 is a perspective view of the structure of a motor vehicle comprising the fuel cell system according to the invention In the different figures, the same reference signs refer to the same or analogous elements.

FIG. 2 is diagrammatic elevation view of a motor vehicle comprising the fuel cell system according to the invention. A super capacitor 146, a battery 144 and a fuel cell 120 are located in the bottom of the vehicle. A DC/DC-converter 141 is located in the bottom in the front of the vehicle. This is advantageous because this heavy component has a large impact on vehicle stability. The DC/DC-converter could also be located at the rear bottom of the vehicle.

In FIG. 2, a hydrogen dosing unit 162 and a hydrogen control unit 161 are located under the floor of the vehicle, under the passenger seat. This is advantageous because this allows the shortest routing of lines between the vessels and the fuel cell.

The hydrogen dosing unit 162 and a hydrogen control unit 161 could however also be located in the front or rear of the vehicle, except for the vehicle crash deformation zone.

The fuel cell system in FIG. 2 comprises two hydrogen vessels, a rear vessel V1 located in the back of the vehicle and a front vessel V2 located in the front of the vehicle. The rear vessel V1 and the front vessel V2 are preferably located between a rear axle beam 180A and a front axle beam 180B, as the rear and the front axle beams protect the vessels in case of a car crash. The rear vessel V1 is preferably located behind the passenger seats because such a location provides a best weight balance but could also be located further backward. However, if the rear vessel is located further backwards, available trunk space could be reduced. If placed even further in the rear, it would enter the crash deformation zone, which is to be avoided for safety reason. The front vessel V2 is preferably located above the feet of the driver and the passenger in the front seat, in the cavity under the dashboard (not shown in FIG. 2) because such a location provides a best weight balance, optimal trunk space and security in case of a car crash. The air conducts that are usually located under the dashboard, may be located on the side of the vehicle, along the floor. However, if the front vessel is located nearer the front of the vehicle, available trunk space and front crash security are reduced.

An electrical motor is provided at the rear 143A or at the front 143B.

The super capacitor has a life expectance equal or superior to that of an ordinary vehicle. Thus, it is possible to integrate it in the bottom frame of the vehicle. In order to integrate the super capacitor with the bottom frame of vehicle, it can be shaped so that it has the same thickness as the car bottom. The life expectancy of a super capacitor exceeds the life expectancy of a battery. The super capacitor can advantageously be designed so that it normally doesn't have to be replaced during the life of the vehicle. Thus, the super capacitor can be integrated in the permanent vehicle structure.

The fact that the super capacitor is integrated in the frame of the vehicle makes the fuel cell system more compact.

The super capacitor has a stack structure and can thus be made as thin as 5 cm and integrated in the structure of the vehicle.

The invention claimed is:

1. A vehicle with a fuel cell system comprising:
   a rear vessel for hydrogen gas located in the rear part of the vehicle,
   a hydrogen dosing unit,
   an air supply;
   a fuel cell connected to the hydrogen dosing unit and the air supply, the air supply being provided with means for providing the fuel cell with air, the hydrogen dosing unit providing the fuel cell with hydrogen,
   a battery,
   a DC/DC-converter,
   wherein the vehicle further comprises:
   a front vessel for hydrogen gas located in the front part of the vehicle,
   a hydrogen control unit connected to the hydrogen dosing unit, to the rear vessel and to the front vessel, the hydrogen control unit being provided with first means for equalizing the pressure between the first rear vessel and the front vessel, the hydrogen control unit being provided with second means for transferring hydrogen at a predetermined pressure level to the hydrogen dosing unit from the two vessels, and
   the fuel cell being connected to the battery so as to provide the battery with energy, the battery and the DC/DC-converter being interconnected so as to exchange energy, the fuel cell and the battery, being located at the bottom of the vehicle.

2. The vehicle according to claim 1, wherein the fuel cell is connected to the DC/DC-converter so at to provide the DC/DC converter with energy.

3. The vehicle according to claim 1, wherein the DC/DC-converter is located at the bottom of the vehicle.

4. The vehicle according to claim 1, further comprising a super capacitor, wherein the fuel cell is connected to the super capacitor so as to provide the super capacitor with energy, wherein the super capacitor is interconnected to the battery so as to exchange energy, and wherein the super capacitor is interconnected to the DC/DC converter so as to exchange energy.

5. The vehicle according to claim 4, wherein the super capacitor is located at the bottom of the vehicle.

6. The vehicle according to claim 5, wherein the super capacitor is adapted to be integrated in the bottom frame of the vehicle.

7. The vehicle according to claim 1, wherein the weight difference between the two vessels is less than 30%.

8. The vehicle according to claim 1, wherein the front vessel is located above the feet of the driver and the passenger in the front seat, in the cavity under the dashboard.

9. The vehicle according to claim 8, wherein air conducts are located on the side of the vehicle.

10. The vehicle according to claim 8, wherein air conducts are located along or under the floor of the vehicle.

11. The vehicle according to claim 1, wherein the weight difference between the two vessels is less than 15%.

12. The vehicle according to claim 1, wherein the weight difference between the two vessels is less than 1%.

* * * * *